Patented Aug. 24, 1948

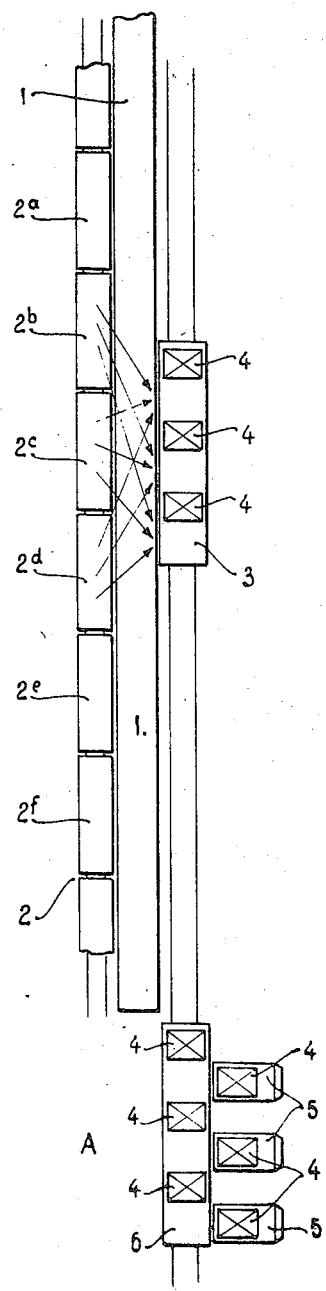

2,447,559

UNITED STATES PATENT OFFICE 2,447,559

SYSTEM FOR TRANSFERRING PACKAGE FREIGHT

Gradus F. Bloemers, Utrecht, Netherlands

Application November 10, 1945, Serial No. 627,846
In the Netherlands November 21, 1940

5 Claims. (Cl. 214—152)

My present invention relates to systems and means for transferring package freight (piece-goods), in less than carload lots, from long distance or interurban means of conveyance such as railroad cars, heavy duty trucks, regular market-boats, etc. to short distance means of conveyance such as relatively light trucks, horse-drawn vehicles, etc. for local distribution, or vice versa.

It has already been suggested to truck package freight, by hand or by tractor trailer, from railroad cars across a stationary platform to containers or removable automobile bodies standing on the platform, to load the containers with the packages, and to transfer the loaded containers to flat delivery trucks by means of a crane traveling on wheels supported by an overhead trackway arranged transversely of the platform.

My invention primarily contemplates to lessen the time during which the delivery trucks have to remain idle owing to the indispensable sorting of the package freight and the loading of the containers therewith, another object being to reduce the distances through which the freight has to be trucked across the stationary platform, thereby saving the expenditure of considerable sums of money. With these objects in view, it includes, briefly, the use of loading boards or load-receiving means supported by a platform traveling beside a stationary platform on the side opposite that on which the long distance means of conveyance are positioned, said traveling platforms being adapted to bring the boards or load-receiving means into position to permit removal thereof and transference to the short distance means of conveyance, or vice versa.

In order that my invention may be fully understood by those skilled in the art, I shall now proceed to describe the same in further detail with reference to the annexed drawing, which, by way of example only, shows a diagrammatic plan view of a stationary railway platform, a train of railroad cars unloading package freight and positioned on one side of said stationary platform, a traveling platform carrying three suitably spaced loading boards or load-receiving means and positioned on the opposite side of said stationary platforms, a second traveling platform also carrying three loading boards or load receiving means, and three delivery trucks each carrying a loading board or load receiving means and brought into position to permit said board or load receiving means being transferred to the second traveling platform.

1 designates the stationary, narrow transfer platform and 2 indicates the train of railroad cars loaded with inbound freight and standing on a railroad track on the left hand side of platform 1. Standing on a railroad track on the right hand side of platform 1 and thus adapted to travel longitudinally thereof is the platform 3 positioned just opposite the railroad cars, 2a, 2b, 2c. Disposed on said traveling platform are three loading boards or load-receiving means 4 portable with relation thereto and arranged transversely thereof at spaced intervals slightly in excess of the width of the boards. Said boards serve for receiving package freight from cars 2a, 2b, 2c and are sized to fit in the load carrying space on the chassis frame of the standard motor trucks, which are used for delivering package freight to the consignees and for bringing such freight from consignors to the station, three trucks, designated by 5, being shown in unloading position relative to the second traveling platform 6 standing outside the station.

It is pertinent here to remark that the surfaces of the traveling platforms are substantially on a level with those of the stationary platform 1 and those of the load carrying floor of the trucks 5.

In carrying out my novel system, package freight from cars 2a, 2b and 2c is hand trucked or otherwise transported across platform 1 to the traveling platform 3, segregated, sorted and deposited, in the one or the other of the interspaces between the loading boards 4 disposed thereon, in accordance with the delivery routes of the boards respectively corresponding to said spaces. Arrows indicate the route of travel between the cars and the loading boards. From each of said spaces, the packages are assembled on the corresponding board in proper position in accordance with the destinations in the delivery section.

After the package freight from cars 2a, 2b, 2c has thus been handled, platform 3 is drawn to a position just opposite the next railroad cars 2d, 2e, 2f, from which it receives packages in the manner described hereinbefore until it is fully loaded. Thereupon, it is drawn to the motor truck parking area A outside the station, where it remains waiting until the arrival there of motor trucks for delivering the packages to the consignees.

In the drawing, the second traveling platform 6 carrying loaded boards is shown standing in the parking area A. As the motor trucks, each carrying a loading board loaded with outbound package freight from consignors in its section, arrive at the station, three trucks are driven backwards into position to permit removal of the loaded boards and transference thereof into the empty spaces between the loaded boards already deposited on the platform 6, whereupon said boards are pushed from the trucks onto the platform. Thereafter, the platform is drawn through a distance equal to the width of a board so that each board loaded with inbound freight is positioned just opposite a truck and can be transferred thereto. Immediately after this transference, the trucks leave for their destinations to deliver the packages as directed by the dispatchers.

From the foregoing it follows that the amount of trucking across the stationary platform 1 is reduced to a minimum, since this platform is not used for storing and sorting freight and may therefore have a minimum width and since the loading boards deposited on the platform always assume positions just opposite the cars from which the freight is being unloaded. Moreover it will be seen that the trucks 5 may be traveling over their delivery routes practically without interruption as they need not remain idly waiting during the unloading trucking and sorting operations.

After the freight brought to the station by the trucks 5 has been deposited on the traveling platform 6 and the freight unloaded from the train 2 has been transferred to said trucks, said platform is again drawn aside platform 1, or aside another stationary platform, across which the freight is hand trucked to the cars of a train positioned on an outbound railway line.

Obviously, two or more traveling platforms with loading boards deposited thereon may be used simultaneously for unloading and loading the cars of a long train.

As to the loading boards, these should be designed so as to be easily transferred between the traveling platform and the delivery trucks. With a view thereto, the boards may be provided with wheels or rollers, and the traveling platform with transverse guideways. Moreover, said platform may have a slight outward slope so that only one boy need be employed for pushing the fully loaded boards from the platform onto the delivery trucks. Preferably, the latter should likewise be provided with suitable guideways and with appropriate means for locking a board deposited thereon in the required relative position.

Since it offers certain difficulties to drive a motor truck backwards and correctly position it with the rear edge of its floor in parallel relation with and closely to the edge of a traveling platform, I recommend to provide for telescopic channel irons of suitable length and hinged, through universal points, to the outer side of said platform so that, when swung into substantially horizontal position at right angles to said side, they form continuations of the transverse guideways on the platform. Thus, the channels virtually constitute bridges, adapted to swivel both horizontally and vertically, between the platform and the delivery trucks, so that it is not necessary for the said trucks to be accurately brought into position relative to the platform for loading and unloading purposes.

It lies within the scope and the spirit of the invention to transfer only part of the inbound package freight to the delivery trucks in the manner stated. Preferably, only the relatively big and heavy packages will thus be handled, whereas the comparatively small and light packages may be hand trucked lengthwise of the stationary platform to an area where they are loaded, in the ordinary manner, onto light motor trucks, horse-drawn carriages or the like.

What I claim is:

1. A system for transferring package freight from a first conveyance to a plurality of second conveyance means comprising the steps of moving said first conveyance means substantially adjacent one side of a stationary platform, spacing a plurality of load receiving means transversely on a movable platform at intervals greater than the width of said load receiving means and positioning said movable platform on the other side of said stationary platform, moving said freight from said first conveyance means across said stationary platform to said load receiving means and loading said freight thereon, moving said movable platform to a zone disposed at a distance from said stationary platform, loading freight on a plurality of second load receiving means, loading said second load receiving means with said freight loaded thereon on a plurality of second conveyance means, moving said second conveyance means into said zone and in juxtaposition with respect to said spaces between said first load receiving means, discharging said second load receiving means with said freight loaded thereon to said spaces between said first load receiving means, moving said movable platform to bring said first loaded load receiving means into juxtaposition with respect to said plurality of second conveyance means, and moving said first loaded load receiving means from said movable platform to said juxtaposed second conveyance means.

2. A system for transferring package freight as recited in claim 1, and the further steps of returning said movable platform to a point adjacent said stationary platform, and transferring said loaded second load receiving means across said stationary platform to said first conveyance means.

3. A system for transferring package freight as recited in claim 1, and the further steps of returning said movable platform to a point adjacent said stationary platform, moving said first conveyance means away from said first side of said stationary platform and moving a third conveyance means adjacent said first side of said stationary platform, and transferring said loaded second load receiving means across said stationary platform to said third conveyance means.

4. A system for transferring package freight from a first conveyance means to a plurality of second conveyance means comprising the steps of moving said first conveyance means substantially adjacent one side of a stationary platform, spacing a plurality of load receiving means transversely on a movable platform at intervals greater than the width of said load receiving means and positioning said movable platform on the other side of said stationary platform, moving said freight from said first conveyance means across said stationary platform to said load receiving means and loading said freight thereon, moving said movable platform to a zone disposed at a distance from said stationary platform, loading second load receiving means on a plurality of second conveyance means, moving said second conveyance means into said zone and in juxtaposition with respect to said spaces between said first load receiving means, discharging said second load receiving means to said spaces between said first load receiving means, moving said movable platform to bring said first loaded load receiving means into juxtaposition with respect to said plurality of second conveyance means, and moving said first loaded load receiving means from said movable platform to said juxtaposed second conveyance means.

5. A system for transferring package freight as recited in claim 4, and the further steps of returning said movable platform to a point adjacent said stationary platform, and transferring said second load receiving means across said stationary platform to said first conveyance means.

GRADUS F. BLOEMERS.

REFERENCES CITED

The following references are of record in the file of this patent:

UNITED STATES PATENTS

| Number | Name | Date |
|---|---|---|
| 701,961 | Swanitz | June 10, 1902 |
| 1,437,968 | Fitch | Dec. 5, 1922 |
| 1,577,185 | Fitch | Mar. 16, 1926 |
| 1,611,882 | Budd | Dec. 28, 1926 |
| 1,830,740 | Leech et al. | Nov. 3, 1931 |
| 1,971,339 | Fitch | Aug. 28, 1934 |